United States Patent [19]
Wimberger-Friedl

[11] Patent Number: 5,845,035
[45] Date of Patent: Dec. 1, 1998

[54] ILLUMINATION SYSTEM FOR A FLAT-PANEL PICTURE DISPLAY DEVICE

[75] Inventor: Reinhold Wimberger-Friedl, Eindhoven, Netherlands

[73] Assignee: U.S. Philips Corporation, New York, N.Y.

[21] Appl. No.: 903,112

[22] Filed: Jul. 30, 1997

[30] Foreign Application Priority Data

Sep. 23, 1996 [EP] European Pat. Off. .............. 96202657

[51] Int. Cl.⁶ ...................................................... G02B 6/10
[52] U.S. Cl. .............................. 385/129; 349/65; 349/57; 362/19; 362/26; 362/31; 385/147
[58] Field of Search ............................. 385/129, 50, 147, 385/901; 349/65, 57, 64, 62; 362/19, 26, 297, 298–302, 304, 305

[56] References Cited

U.S. PATENT DOCUMENTS

| | | | |
|---|---|---|---|
| 4,212,048 | 7/1980 | Castleberry | 362/19 |
| 4,985,809 | 1/1991 | Matsui | 362/31 |
| 5,729,311 | 3/1998 | Broer et al. | 349/65 |

*Primary Examiner*—Akm E. Ullah
*Attorney, Agent, or Firm*—John C. Fox

[57] ABSTRACT

The invention relates to an illumination system comprising an optical waveguide of an optically transparent material having an exit surface and a plurality of end faces, and a light source whose light is coupled into the waveguide via at least one end face of the waveguide. The waveguide further comprises polarizing means for polarizing the light emitted by the light source. The waveguide comprises at least two layers, of which one layer comprises an optically anisotropic material having refractive indices $n_e$ and $n_o$ and the other layer comprises an optically isotropic material having a refractive index $n_i$, in which one of the refractive indices $n_e$ or $n_o$ is equal to $n_i$. For the refractive indices, $n_e$ or $n_o$ should be equal or substantially equal to $n_i$ in order that polarization separation occurs at the interface between the isotropic and the anisotropic material. The invention also relates to a flat-panel picture display device including such an illumination system.

18 Claims, 2 Drawing Sheets

ILLUMINATION SYSTEM FOR A FLAT-PANEL PICTURE DISPLAY DEVICE

FIELD OF THE INVENTION

The invention relates to the field of flat panel LCD displays and is most closely related to the field of backlighting flat displays.

BACKGROUND OF THE INVENTION

The invention relates to an illumination system comprising an optical waveguide of an optically transparent material having an exit surface and a plurality of end faces, opposite at least one of which a light source is situated, whose light can be coupled in at said end face of the optical waveguide, and polarizing means for polarizing the light emitted by the light source.

The invention also relates to a flat-panel picture display device comprising such an illumination system.

A flat-panel picture display device which is provided with an illumination system of the type described in the opening paragraph is known from U.S. Pat. No. 4,212,048. In the picture display device described in this Patent, a picture display panel is illuminated by means of an illumination system which consists of a wedge-shaped transparent plate and a light source. The light rays emitted by the light source are coupled in at the end face of the optical waveguide and propagate through the waveguide because they undergo total internal reflection at the interface between optical waveguide and air. Since the angle of incidence of the light rays on the waveguide-air interface decreases upon each reflection, this angle will be smaller at a given instant than the critical angle and the relevant light rays will leave the optical waveguide. Moreover, the optical waveguide comprises polarizing means in the form of a strip of polarizing material which extends across the thickness of the optical waveguide in the vicinity of the light source. In this way, it is ensured that the light leaving the optical waveguide is polarized.

The above citations are hereby incorporated in whole by reference.

SUMMARY OF THE INVENTION

A drawback of the illumination system described in said U.S. Patent is that substantially 50% of the light supplied by the light source is lost without being able to contribute to the formation of the image, because the polarizer is dichroic and thus absorbs the unwanted direction of polarization. A further drawback is that the optical waveguide must be wedge-shaped in order that light can be coupled out at the exit surface of the optical waveguide. Due to the requirement of a sufficient light output, the freedom of design or the choice of the material for the optical waveguide is limited. In fact, a short time after the light is coupled into the optical waveguide, it reaches the polarizer and is thus polarized. This polarized light propagates through the optical waveguide until it is incident on the exit surface at an angle which is smaller than the critical angle for total internal reflection, and is consequently coupled out. Since, in practice, isotropic material is not perfectly isotropic, there will still be depolarization during propagation through the optical waveguide. Consequently, the output of polarized light having the same direction of polarization is reduced considerably. Either the distance which is covered before coupling out should therefore be relatively short, which limits the freedom of design of the optical waveguide, or the material of the optical waveguide should be very much isotropic, which limits the choice of the material.

It is an object of the present invention to provide an illumination system in which a relatively large part of the light emitted by the light source is converted into light having the same direction of polarization before it leaves the optical waveguide, and in which the shape and the material of the optical waveguide do not have a limiting effect on the light output.

To this end, the illumination system according to the invention is characterized in that the waveguide comprises at least two layers, of which one layer comprises an optically anisotropic material having refractive indices $n_e$ and $n_o$ and the other layer comprises an optically isotropic material having a refractive index $n_i$, in which one of the refractive indices $n_e$ or $n_o$ is at least substantially equal to $n_i$. An interface is formed between the isotropic and the anisotropic layer. When unpolarized light is coupled into, for example, the anisotropic layer, in other words, when the anisotropic layer is used as a waveguiding layer, this light will be split up into two beam components whose directions of polarization are parallel to the preferred directions of the medium, i.e. parallel and perpendicular to the interface between the isotropic and the anisotropic layer. The component with the direction of polarization perpendicular to the interface, referred to as the s-component, will detect no refractive index difference at the interface and will consequently be passed towards the exit surface of the waveguide. The state of polarization of this waveguide remains unchanged. However, a condition is that the angle of incidence of the beam component at the interface must be smaller than the critical angle for total internal reflection. However, this angle of incidence can be determined when coupling the unpolarized light beam into the anisotropic layer. The other beam component, referred to as the p-component, does detect a refractive index difference at the interface and, provided that the refractive index difference is large enough, it will undergo total internal reflection at this interface and consequently reach the anisotropic layer. The beam component which remains in the waveguiding layer will depolarize after some time during propagation through the layer, because the material of this layer is anisotropic. Consequently, the light beam will comprise both directions of polarization after a given propagation distance, in other words, both the s-component and the p-component. If this light is again presented to the interface between isotropic and anisotropic material, there will be polarization separation again. Upon arrival at this interface, the s-component will be passed on again towards the exit surface of the waveguide. The p-component is reflected in the waveguiding layer and, as described above, will again depolarize, reflect, partly be coupled out, and so forth. If there is a great extent of anisotropy, the p-component will have been converted substantially completely into an unpolarized beam only after several reflections on the interface, so that approximately half thereof already has the suitable direction of polarization to be passed unhindered through the interface. The extent of anisotropy of the anisotropic material thus determines the number of reflections on the interface between the isotropic and anisotropic layer. By suitable choice of the anisotropic material, an optimum intensity distribution on the surface of the waveguide can be obtained.

This process is repeated every time, so that a relatively large part of the light emitted by the light source is converted into light having the same, i.e. desired direction of polarization before it is coupled out at the exit surface of the waveguide. A relatively high light output will be realized in this way. The optical waveguide may have, but does not need to have the shape of a wedge in order to couple out light from the waveguide.

The larger the difference between the ordinary and the extraordinary refractive index of the anisotropic material, the larger the acceptance angle of the waveguide.

A preferred embodiment of the illumination system according to the invention is characterized in that the waveguide is constituted by the isotropic layer and in that the refractive index $n_i$ of the isotropic layer is substantially equal to the largest of the refractive indices $n_o$ and $n_e$.

Also the isotropic layer may be used as a waveguiding layer. The light is then coupled into the isotropic layer. A condition is that the largest refractive index of the anisotropic layer should approximate the refractive index of the isotropic layer. If this is not the case, a transition to a denser medium will occur for one of the directions of polarization so that no full reflection can occur at the interface. An advantage of this embodiment is that isotropic material has a low diffusion level and that there is a wide choice of material. A further advantage is that the anisotropic layer can be provided as a thin layer in this case, so that this also provides a very wide choice of material.

A further embodiment of the illumination system according to the invention is characterized in that an anisotropic layer is present at the surface of the waveguide facing away from the exit surface.

The direction of polarization of the light beam can be adapted by this layer, independently of the optical properties of the waveguiding layer, both in the case of an anisotropic and in the case of an isotropic waveguiding layer.

However, the depolarization may be intensified by the additional anisotropic layer on the surface opposite the exit surface and/or by the anisotropic layer which is present on top of the isotropic waveguiding layer.

If the waveguiding layer consists of, for example, optically anisotropic material, the extra layer should be anisotropic in the direction of the optical axis which is not parallel to that of the anisotropic waveguiding layer.

A further embodiment of the illumination system according to the invention is characterized in that the exit surface of the waveguide has a collimating structure.

In this way, the light exiting at the exit surface of the waveguide is collimated, which contributes to the brightness of the picture display device in which the illumination system is used.

The layer which does not function as the waveguiding layer may be a discontinuous layer or a layer having a surface structure. The light exiting from the waveguide can then not only be collimated but it can also be ensured that the light is homogeneously distributed across the exit surface.

A further embodiment of the illumination system according to the invention is characterized in that the collimating structure comprises a microlens array.

A microlens array is a known element which is very suitable for this application.

A further embodiment of the illumination system according to the invention is characterized in that a reflector having a depolarizing effect is arranged on at least one end face remote from a light source.

It is known to provide the optical waveguide of flat illumination systems with a reflector at the end faces where no light is coupled in, so as to prevent that light arriving there is lost and thus does not contribute to the light output of the illumination system. The reflector sends the light into the optical waveguide again. In this way, this light is given a new chance of being coupled out as yet on the exit surface.

If the reflectors at the end faces have a depolarizing effect, the light incident thereon, which has a direction of polarization which is undesirable for coupling out at the exit surface, is depolarized, so that approximately half of this light immediately acquires the suitable direction of polarization and can be coupled out of the optical waveguide. The other half may depolarize again during propagation through the waveguide. The advantage of the depolarizing reflector is that, independent of the birefringence of the material of the waveguiding layer, there will be depolarization of the unwanted beam component.

A further embodiment of the illumination system according to the invention is characterized in that the end faces of the waveguide are implemented as a collimator.

In order that substantially complete reflection for the p-component occurs at the interface between the isotropic and the anisotropic layer, the acceptance angle of the waveguide and the refractive index difference in the anisotropic material should be adapted to each other. This angle will be increasingly smaller than at an air interface. Such an adaptation can be achieved by implementing the end faces of the waveguide as a collimator.

A further embodiment of the illumination system according to the invention is characterized in that the collimator is constituted by a cylindrical lens.

A further embodiment of the illumination system according to the invention is characterized in that the optically anisotropic material is an anisotropic polymer gel or an anisotropic polymer network.

These materials are particularly suitable for use as a birefringent material in the form of a birefringent layer.

Those skilled in the art will understand the invention and additional objects and advantages of the invention by studying the description of preferred embodiments below with reference to the following drawings which illustrate every feature of the appended claims.

DETAILED DESCRIPTION OF THE PREFERRED EMBODIMENT

Figure 1:
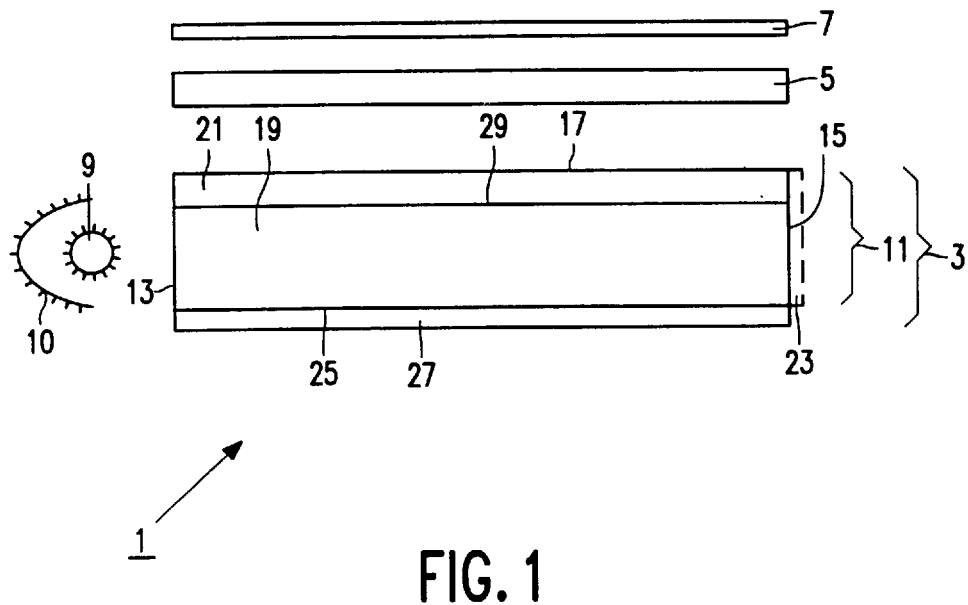
FIG. 1 shows an embodiment of a flat-panel picture display device with an illumination system according to the invention.

The picture display device 1 diagrammatically shown in FIG. 1 comprises, in this order, an illumination system 3, a picture display panel 5 and an analyzer 7. The illumination system 3 comprises an optical waveguide 11 which consists of an optically transparent material and has four end faces 13, 14, 15, 16. A light source 9 whose light is coupled into the waveguide 11 via the end face 13 is present opposite one of the end faces, for example, 13. The light source 9 may be, for example, a rod-shaped fluorescence lamp. The light source may alternatively be constituted, for example, by one or more light-emitting diodes (LED), notably in flat-panel picture display devices with small picture display panels as in, for example, a cellular telephone.

A reflector 10 is present at the side of the light source 9 facing away from the optical waveguide 1. This reflector 10 ensures that light emitted by the light source 9 in a direction remote from the optical waveguide 1 is as yet reflected towards the waveguide. The exit surface 17 of the waveguide 11 is directed towards the picture display panel 5.

An extra polarizer (not shown) may be arranged on or proximate to the exit surface 17 of the waveguide 11 in order to further optimize the efficiency of polarization.

In the illumination system 3 according to the invention, the unpolarized light coming from the light source 9 is substantially completely converted into light having the same direction of polarization without any noticeable loss of light.

The light having the desired direction of polarization, supplied by the illumination system 3, is subsequently modulated in its direction of polarization by the picture display panel 5 in conformity with the picture information to be displayed. Subsequently, the modulated light is incident on the analyzer 7 which blocks the light coming from those pixels on the picture display panel which must appear as dark pixels in the final picture. The analyzer 7 may be, for example, an absorbing polarizer which absorbs the unwanted direction of polarization, but also a reflecting or refracting polarizer which removes a direction of polarization, which is undesirable for the picture, from the light path.

The picture display panel 5 may be, for example, a liquid crystalline material in which a matrix of pixels is arranged and whose operation is based on the twisted nematic effect (TN), the supertwisted nematic effect (STN), or the ferroelectric effect so as to modulate the direction of polarization of light incident thereon.

In order that the illumination system 3 supplies polarized light, the waveguide 11 is constituted by at least two layers 19, 21, of which one layer comprises optically isotropic material having a refractive index $n_i$ and the other layer comprises optically anisotropic material having refractive indices $n_o$ and $n_e$. Both the anisotropic layer and the isotropic layer may function as waveguiding layers.

Figure 2:
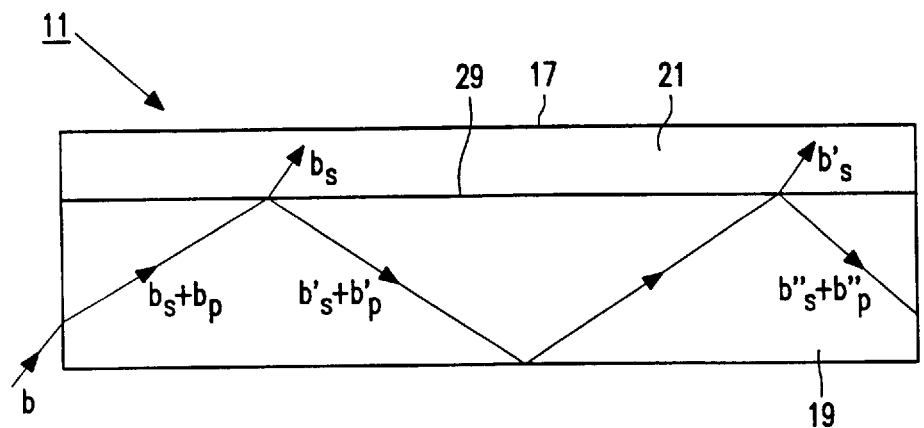
FIG. 2 is a cross-section of an embodiment of an illumination system according to the invention, in which the beam path is also illustrated.
Figure 3A:
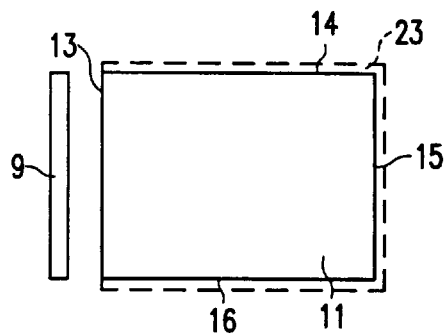
FIGS. 3a to 3d show a number of embodiments of illumination systems with different configurations of the light source.
Figure 3B:
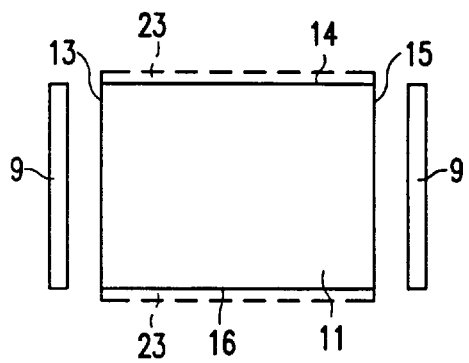
Figure 3C:
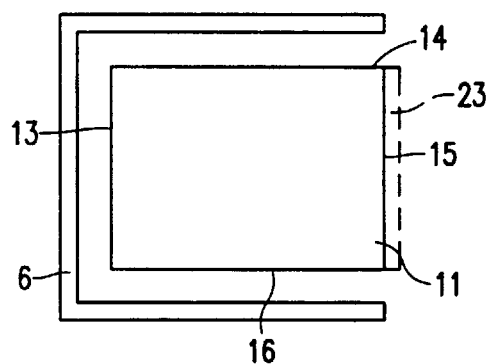
Figure 3D:
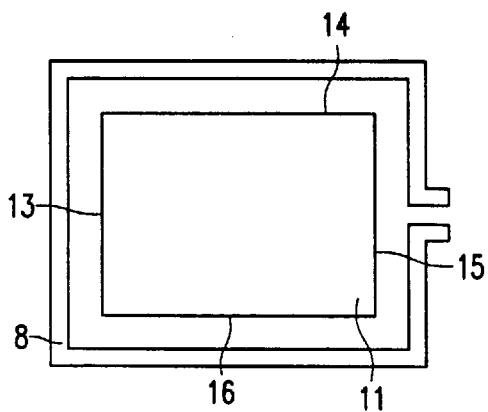

FIG. 2 illustrates the radiation path in a waveguide according to the invention. When an unpolarized light beam b is coupled into the waveguiding layer 19, there will be polarization separation at the interface 29. In fact, the unpolarized beam comprises two beam components $b_s$ and $b_p$ whose directions of polarization are parallel to the preferred directions of the medium. This means that the polarization plane of the one beam component is parallel to the interface 29 between the isotropic layer and the anisotropic layer, while the polarization plane of the other beam component is perpendicular to this interface 29. The beam component with the direction of polarization perpendicular to the interface 29, in other words, the s-component, will detect no refractive index difference and will be passed through the interface 29 to the exit surface 17 of the waveguide 11. The other beam component, the p-component, does detect a refractive index difference and will be reflected at the interface 29 and reach the waveguiding layer 19 again. By propagation in this layer, this beam component will depolarize due to the (slight extent of) anisotropy so that at least a part of the beam has both directions of polarization s' and p' after having covered a given distance. When this beam $b_s'+b_p'$ impinges upon the interface 29, a part ($b_s'$) will consequently be passed unhindered through the interface 29 towards the exit surface 17 of the waveguide 11.

The angle of incidence of the s-component at the interface 29 should be smaller than the angle for total internal reflection, whereas the angle of incidence of the p-component should be larger than the critical angle for total internal reflection. These angles are determined by the refractive index difference between the ordinary and the extraordinary refractive index of the anisotropic material so that the acceptance angle of the waveguide is also fixed.

Both the isotropic layer and the anisotropic layer may serve as a waveguiding layer. If the waveguiding layer is isotropic, and if depolarization is to occur, the isotropic material of this layer should be anisotropic to a slight extent. This is generally the case in practice.

In this case, the refractive index $n_i$ of the isotropic layer should be equal to the largest of the refractive indices $n_e$ and $n_o$.

A suitable isotropic material as a waveguiding layer is, for example, PMMA or polycarbonate.

Suitable anisotropic materials to be provided as a layer on the isotropic waveguiding layer are, for example, anisotropic polymer gels as described in, for example, EP 0 451 905 (PHN 13.299) or anisotropic polymer networks as described in, for example, EP 0 213 680 (PHN 11.472).

An example of a way in which a waveguide can be realized for an illumination system according to the invention will now be described. A sheet of PET is extruded and stretched at a tension of, for example, 12 MPa at 80° C. The material thereby becomes anisotropic with $n_e=1.65$ and $n_o=1.53$. A foil of COC (Cyclic Olefine Polymer) with $n_i=1,53$ is laminated on this sheet. The COC foil may be provided with a suitable surface structure. This may be done, for example, by replication via a thermal process or a polymerization process.

If the waveguiding layer is implemented in an anisotropic material, PET (polyethylene terephthalate) or PEN (polyethylene naphthalate) are very suitable as materials. The isotropic layer provided on the anisotropic layer may then be, for example, an acrylic layer.

Each end face 15 of the transparent plate, in which light is not coupled in, can be provided with a reflector 23. In this way, light which is not coupled out at the exit surface 17 and consequently propagates through the optical waveguide and reaches an end face, is prevented from leaving the optical waveguide 11 via this end face 15. In fact, the reflector 23 reflects the light back into the waveguide 11. This reflector 23 is preferably a depolarizing reflector. Then there is, in any case, complete depolarization at the end of the waveguiding layer. The reflector 23 may be implemented, for example, as a vapor-deposited thin film or as a foil. The Figures show this reflector in broken lines because it is an optional element.

The surface 25 which is located opposite the exit surface 17 may be provided with an additional layer 27 of anisotropic material. The direction of polarization of the light beam can be adapted by this layer 27, independently of the optical properties of the waveguiding layer, both in the case of an anisotropic layer and in the case of an isotropic waveguiding layer. If the waveguiding layer 19 consists of, for example, optically anisotropic material, the extra layer 27 should be anisotropic in the direction of the optical axis which is not parallel to that of the anisotropic waveguiding layer.

A collimating structure 31 is preferably provided on the exit surface 17 of the waveguide 11. The light exiting from the waveguide 11 is collimated thereby, which contributes to the brightness of the illumination system within a given viewing angle. The collimating structure may be constituted by, for example, a microlens array.

To ensure that the p-component is substantially completely reflected at the interface 29, the acceptance angle of the waveguide and the refractive index difference of the anisotropic material should be adapted to each other. A further adaptation may be realized by implementing one or more end faces of the waveguide, equal to the number of end faces where light is coupled in, as a collimator. This may be done, for example, by implementing the relevant end face as a cylindrical lens.

Instead of providing a fluorescence lamp 9 at only one end face 13, a rod-shaped lamp 9 may also be provided at the opposite end face 15 so as to achieve a greater brightness. It is also possible to provide a rod-shaped lamp 9 on a third end face 14 and possibly on a fourth end face 16. Instead of one separate rod-shaped lamp per end face, for example, a single rod-shaped lamp 6, 8 having a number of bends may be used for illuminating three or four end faces. This enhances the efficiency of the illumination system, because the losses in such a lamp decrease with an increasing length. All the above-mentioned possibilities are illustrated in FIGS. 3a to 3d, which show a number of illumination systems in plan views with different light source configurations.

If light is coupled in at only one end face (FIG. 3a), or if light is coupled in at two parallel end faces (FIG. 3b), the optical axis of the anisotropic material is preferably parallel to the longitudinal direction of the rod-shaped lamp. If the rod-shaped lamps are not parallel, but enclose an angle (FIGS. 3c, 3d), the optical axis of the anisotropic areas preferably encloses such an angle with the plane of the incident light that the direction of polarization will be at an angle to the axis of the rod-shaped lamp. In practice, the rod-shaped lamps are usually located perpendicularly with respect to each other, and the optical axis is preferably oriented at an angle of substantially 45° with respect to the rod-shaped lamps.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

I claim:

1. An illumination system comprising:
    an optical waveguide of an optically transparent material having an exit surface and a plurality of end faces;
    a light source opposite from one of the end faces and whose light can be coupled in at said end face of the optical waveguide; and
    polarizing means for polarizing the light emitted by the light source, the waveguide having at least two layers, including:
    one layer with an optically anisotropic material having refractive indices $n_e$ and $n_o$; and
    another layer with an optically isotropic material having a refractive index $n_i$, in which one of the refractive indices $n_e$ or $n_o$ is at least substantially equal to $n_i$.

2. The illumination system of claim 1, wherein the refractive index $n_i$ of the layer with isotropic material is substantially equal to the largest of the refractive indices $n_o$ and $n_e$.

3. The illumination system of claim 1 wherein the layer with anisotropic material is at the surface of the waveguide facing away from the exit surface.

4. The illumination system of claim 1 further comprising a collimating structure at the exit surface of the waveguide.

5. The illumination system of claim 4, wherein the collimating structure includes a microlens array.

6. The illumination system of claim 1 further comprising a reflector having a depolarizing effect on at least one end face remote from a light source.

7. The illumination system of claim 1 wherein the end faces of the waveguide are a collimator.

8. The illumination system of claim 7, wherein the collimator end faces include a cylindrical lens.

9. The illumination system of claim 1, wherein the optically anisotropic material includes an anisotropic polymer gel or an anisotropic polymer network.

10. A flat-panel picture display device comprising:
    an illumination system provided with a picture display panel for modulating the direction of polarization of light emitted by the illumination system in conformity with picture information to be displayed; and
    an analyzer; and
    wherein the illumination system includes:
    an optical waveguide of an optically transparent material having an exit surface and a plurality of end faces;
    a light source opposite from one of the end faces and whose light can be coupled in at said end face of the optical waveguide; and
    polarizing means for polarizing the light emitted by the light source, the waveguide having at least two layers, including:
    one layer with an optically anisotropic material having refractive indices $n_e$ and $n_o$; and
    another layer with an optically isotropic material having a refractive index $n_i$, in which one of the refractive indices $n_e$ or $n_o$ is at least substantially equal to $n_i$.

11. The device of claim 10, wherein the refractive index $n_i$ of the layer with isotropic material is substantially equal to the largest of the refractive indices $n_o$ and $n_e$.

12. The device of claim 10, wherein the layer with anisotropic material is at the surface of the waveguide facing away from the exit surface.

13. The device system of claim 10 further comprising a collimating structure at the exit surface of the waveguide.

14. The device system of claim 13, wherein the collimating structure includes a microlens array.

15. The device of claim 10 further comprising a reflector having a depolarizing effect on at least one end face remote from a light source.

16. The device of claim 10, wherein the end faces of the waveguide are collimator.

17. The device of claim 16, wherein the collimator end faces include a cylindrical lens.

18. The device of claim 10, wherein the optically anisotropic material includes an anisotropic polymer gel or an anisotropic polymer network.

* * * * *